Oct. 24, 1944.  R. M. GOODERHAM  2,361,284
ELECTRIC WELDING ROD HOLDER
Filed June 29, 1943
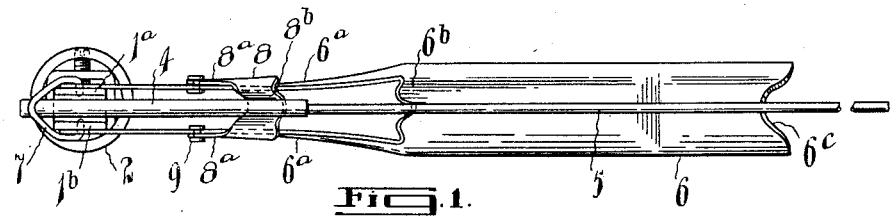
Fig. 1.
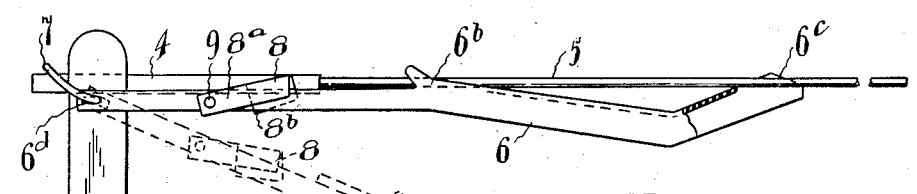
Fig. 2.
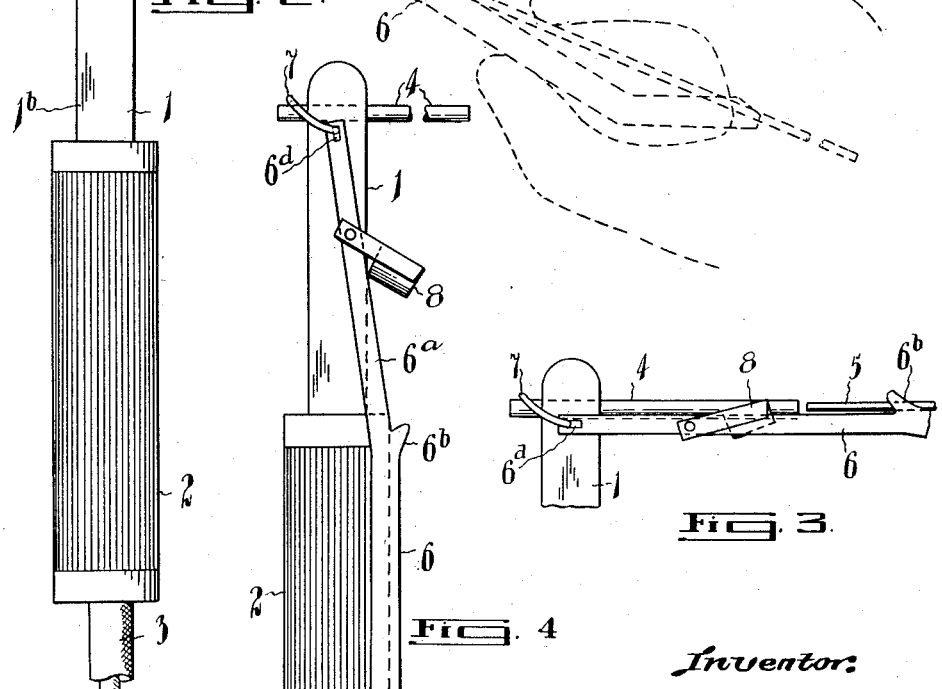
Fig. 3.
Fig. 4
Inventor:
RONALD MACDONALD GOODERHAM
By Gareth E. Maybee
Attorney.

Patented Oct. 24, 1944

2,361,284

UNITED STATES PATENT OFFICE 2,361,284

ELECTRIC WELDING ROD HOLDER

Ronald MacDonald Gooderham, Toronto, Ontario, Canada

Application June 29, 1943, Serial No. 492,711

9 Claims. (Cl. 219—8)

This invention relates to a holder for carrying an electric welding rod or electrode. Such holders are provided with means between which the electric welding rod is clamped, forming the necessary electrical connection. During the welding operation the welding rod is consumed. Before it is entirely used, the stub which remains in the holder must be removed and discarded and a new welding rod inserted in the holder. This results in a very large waste of material, which it is the object of this invention to avoid.

The object of this invention is achieved by providing means for axially aligning a welding rod with the stub of a partly used welding rod or with a specially provided stub, so that they may be fused together. In this way, the same stub may be used repeatedly by fusing fresh welding rods thereto, and there is no waste of material.

The invention is hereinafter more specifically described and illustrated by way of example in the accompanying drawing in which Figure 1 is an end view of the holder with the aligning support in operative position, showing welding rod in engagement with the stub;

Figure 2 a side elevation showing the aligning support in operative position in full lines and in dotted lines in intermediate position with hand holding the new welding rod;

Figure 3 a fragmentary side elevation showing the aligning support and welding rod in operative position with welding rod spaced from the stub to form an arc gap between the ends; and Figure 4 a side elevation showing the aligning support in inoperative position.

In the various figures corresponding numerals refer to corresponding parts.

The details of construction of the holder, being well known, are not shown or described. Generally speaking the holder comprises a copper clamping member 1 and an insulated handle 2 within which is the connection with a power cable 3. The clamping member 1 comprises two spaced apart members $1^a$ and $1^b$ adapted to receive between them a stub 4 to hold the said stub firmly in any desired position. For the purposes of the present invention this stub may be the unburned end of an ordinary metal welding rod or may be a special steel rod made for the purpose. Preferably the stub is of greater diameter than the welding rod to which it is to be secured.

For aligning a new metal welding rod 5 with the stub 4, there is provided an aligning support 6. This support may be made of fibre, hard rubber or other suitable non-conducting material, or may be of metal suitably insulated from the clamping member and the welding rod.

The holder 6 has forked ends $6^a$, $6^a$ which are connected to the outer sides of the clamping members $1^a$ and $1^b$ by means of a bale member 7. Alternatively, a pair of pins secured to and extending outwardly from the parts $1^a$ and $1^b$ of the clamping member 1 may be used for connecting said support to the said clamping member. The bale is particularly useful, since the stub 4 may be forced between the two parts $1^a$ and $1^b$ of the clamping member 1 by inserting one end thereof under the bale and forcing the other end of the stub downwardly so that the stub passes into and is clamped between the two parts of the clamping member 1. It will be understood that other means of securing or clamping the stub 4 may be used without departing from this invention.

The stub 4 is secured in the clamping member at or adjacent the point at which the aligning support 6 is connected to said clamping member, and said support 6 is adapted to swing to an operative position in substantial alignment with the stub 4 and to an inoperative position overlying the handle 2 (see Figures 2 and 4).

A positioning member 8 is hinged between the forked ends $6^a$, $6^a$ of the support 6. This positioning member is provided with two arms $8^a$, $8^a$ which are pivoted to the forked ends $6^a$, $6^a$ by means of pins 9, 9, and a curved portion $8^b$ which forms a groove which lies between the forked ends $6^a$, $6^a$ of the support 6 and is adapted to receive the stub 4 when the support is in operative position as shown in Figure 2. When the supporting member is in inoperative position as shown in Figure 4 the positioning member 8 will swing outwardly to permit the forked ends $6^a$ and $6^b$ to pass on either side of the clamping member 1 and enable the aligning support to overlie the handle 2.

The outer end of the aligning support 6 curves downwardly and then outwardly or upwardly at its end and its underside is concave so as to fit over the handle 2.

The outer or upper side of the outer end of the aligning support 6 is provided with two grooves or notches $6^b$ and $6^c$ for receiving the welding rod 5. These notches are aligned with the groove $8^b$ in the positioning member 8, so that when the support 6 is swung up into operative position as shown in full lines in Figure 2, the welding rod 5 will be substantially axially aligned with the stub 4.

In use the support 6 overlies the handle 2 as shown in Figure 4 and the welder places his hand over the support 6 and around the handle 2. When it is desired to insert a new welding rod, the holder 6 is swung up to the intermediate position shown in Figure 2 in dotted lines and a welding rod 5 is placed in the notches 6^b and 6^c. The holder is then swung up to the position shown in full lines in Figure 2. The stub ends of the support 6 are slotted as shown at 6^d, and when the holder is in operative position, it is pushed in so that the inner ends of the slots 6^d engage the ends of the bale 7 as shown in Figure 3, and the end of the welding rod 5 is in engagement with the stub 4.

Holding the new welding rod 5 firmly in position on the support 6, the outer end of the welding rod 5 is grounded on the work or otherwise, so that a current will flow therethrough. Still holding the welding rod 5 firmly in position on the support 6, the holder is pulled out so that the ends of the bale 7 slide in the slots 6^d of the holder until they engage the outer ends of the slots 6^d. This movement is sufficient to separate the welding rod 5 from the stub 4 to form an arc gap between their ends. The arc is maintained sufficiently long for the ends of the stub and welding rod to become semi-molten and then the welding rod and the holder are pushed back until the ends of the stub and welding rod are again in contact and are fused together. The fused ends soon harden and the welding rod 5 is then used in the usual way until it burns down to the stub again, when a new welding rod may be placed in position in the same manner as described above.

Usually the welding rod will be aligned substantially axially of the stub, but for special purposes it may be aligned in one plane only, extending from the end of the stub at an angle to enable it to be more conveniently fused in awkward positions.

The aligning member being constructed of insulating material or insulated will in its operative position shroud the stub end of the welding rod so that it may be laid on a grounded surface without arcing. The insulated aligning member in combination with the insulated handle of the holder will support the welding rod and the clamping portion of the holder and the stub above the surface on which it is resting thus preventing completion of the welding circuit.

Although the invention has been described in some detail it will be understood that many modifications may be possible, and applicant does not desire to be restricted to the details described above and shown in the drawing.

What I claim as my invention is:

1. A holder for carrying an electric welding rod; and means connected with the holder for supporting a welding rod with its end in contact with a stub held by said holder so that they may be fused together, said means being movable out of supporting position after the rod and stub have been fused.

2. A holder for carrying an electric welding rod; and a support made of insulating material connected with the holder for supporting a welding rod with its end in contact with a stub held by said holder so that they may be fused together, said support being movable out of supporting position after the rod and stub have been fused.

3. An electric welding rod holder adapted to carry a stub; and an insulated support connected with the holder for supporting a welding rod in contact with the stub with their ends together so that they may be fused, said support being movable longitudinally a distance sufficient to separate the ends of the welding rod and stub to form an arc gap between said ends, and said support being movable out of supporting position after the rod and stub have been fused.

4. An electric welding rod holder adapted to carry a stub; and a support connected with the holder for aligning a welding rod with the stub with their ends together so that they may be fused, said support having a pin and slot connection with the holder to permit the support to be moved longitudinally a distance sufficient to separate the ends of the welding rod and stub to form an arc gap between said ends.

5. An electric welding rod holder comprising a clamping member adapted to carry a stub, and a handle; and an insulated support for aligning a welding rod with the stub with their ends together so that they may be fused, said support being swingably connected with the clamping member, whereby it may be swung outwardly to engage the stub or inwardly to overlie the handle.

6. An electric welding rod holder comprising a clamping member adapted to carry a stub, and a handle; and an insulated support for aligning a welding rod with the stub with their ends together so that they may be fused, said support having a forked end pivotally secured to either side of the clamping member by pins, and a positioning member hinged to the forks and adapted to engage the stub and position the support when it is swung out.

7. An electric welding rod holder comprising a clamping member adapted to carry a stub, and a handle; and an insulated support for aligning a welding rod with the stub with their ends together so that they may be fused, said support having a forked end pivotally secured to either side of the clamping member by pins, and a positioning member secured to the forks and having a grooved portion between the forks to receive the stub when the support is swung out.

8. An electric welding rod holder adapted to carry a stub; and a support swingably connected with the holder for aligning a welding rod with the stub held by said holder so that they may be fused together, said support having a part which engages the stub, and being grooved to receive a welding rod and support same in alignment with the stub.

9. An electric welding rod holder comprising a clamping member adapted to carry a stub, and a handle; and an insulated support for aligning a welding rod with the stub with their ends together so that they may be fused, said support being swingably connected with the clamping member, whereby it may be swung outwardly to engage the stub or inwardly to overlie the handle, said support being shaped to fit over the handle when swung inwardly, and having outwardly extending grooved or notched portions adapted to receive a welding rod and support same in alignment with the stub when the support is swung out.

R. M. GOODERHAM.